United States Patent
Lee et al.

(10) Patent No.: US 9,008,032 B2
(45) Date of Patent: Apr. 14, 2015

(54) FREQUENCY BAND SETTING APPARATUS AND METHOD, ACCESS POINT, AND FREQUENCY BAND USING METHOD OF ACCESS POINT

(75) Inventors: In Sun Lee, Seongnam-si (KR); Kyung Hun Jang, Suwon-si (KR); Chan Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 12/880,919

(22) Filed: Sep. 13, 2010

(65) Prior Publication Data

US 2011/0064062 A1 Mar. 17, 2011

(30) Foreign Application Priority Data

Sep. 16, 2009 (KR) .................. 10-2009-0087532

(51) Int. Cl.
 *H04W 4/00* (2009.01)
 *H04W 16/04* (2009.01)
 *H04W 84/12* (2009.01)
(52) U.S. Cl.
 CPC .............. *H04W 16/04* (2013.01); *H04W 84/12* (2013.01)
(58) Field of Classification Search
 None
 See application file for complete search history.

(56) References Cited

U.S. PATENT DOCUMENTS

| 7,864,663 | B2 * | 1/2011 | Dent ............................. 370/210 |
| 8,285,295 | B2 * | 10/2012 | Westerberg et al. .......... 455/450 |
| 2004/0114606 | A1 | 6/2004 | Haddad |
| 2004/0203828 | A1 | 10/2004 | Mirchandani et al. |
| 2005/0041619 | A1 * | 2/2005 | Karabinis et al. ............. 370/329 |
| 2005/0083838 | A1 | 4/2005 | Kandala |
| 2006/0251013 | A1 | 11/2006 | Roy et al. |
| 2006/0286986 | A1 * | 12/2006 | Kim et al. ...................... 455/450 |
| 2006/0291432 | A1 | 12/2006 | Xhafa et al. |
| 2007/0287469 | A1 * | 12/2007 | Wijting et al. ................ 455/454 |
| 2008/0291821 | A1 * | 11/2008 | Dent ............................. 370/210 |
| 2009/0279480 | A1 * | 11/2009 | Rosenqvist et al. .......... 370/328 |
| 2010/0035620 | A1 * | 2/2010 | Naden et al. .................. 455/450 |
| 2010/0248736 | A1 * | 9/2010 | Hulkkonen et al. ....... 455/452.2 |
| 2010/0248739 | A1 * | 9/2010 | Westerberg et al. .......... 455/453 |

FOREIGN PATENT DOCUMENTS

| KR | 10-0605371 | 7/2006 |
| KR | 10-2008-0019605 | 3/2008 |
| WO | WO 2006/026679 | 3/2006 |

* cited by examiner

*Primary Examiner* — Bob Phunkulh
(74) *Attorney, Agent, or Firm* — NSIP Law

(57) ABSTRACT

A frequency band setting apparatus and method are provided. The frequency band setting apparatus may include a calculation unit and a control unit. The calculation unit may calculate a basic frequency band of each of a plurality of Access Points (APs), and the control unit may divide a frequency band, which is available to the plurality of APs, into each of the calculated basic frequency bands and a common frequency band.

23 Claims, 17 Drawing Sheets

FIG. 3
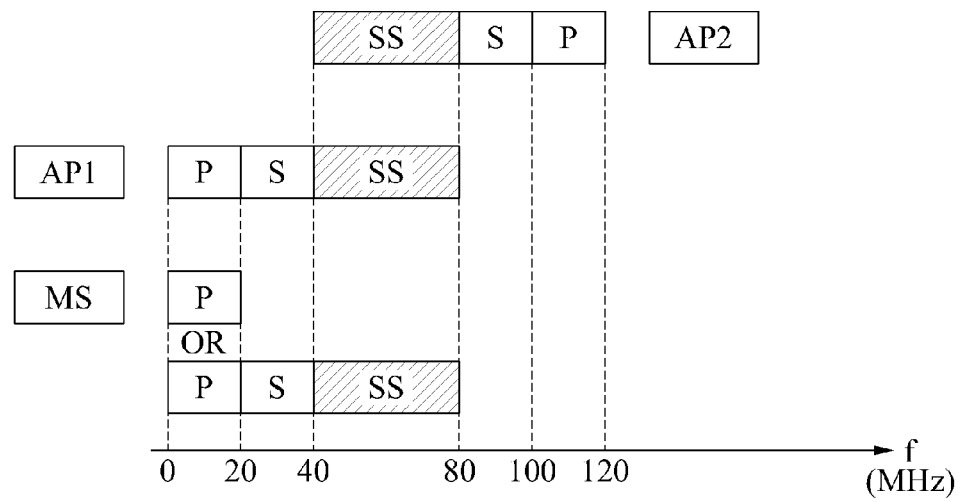
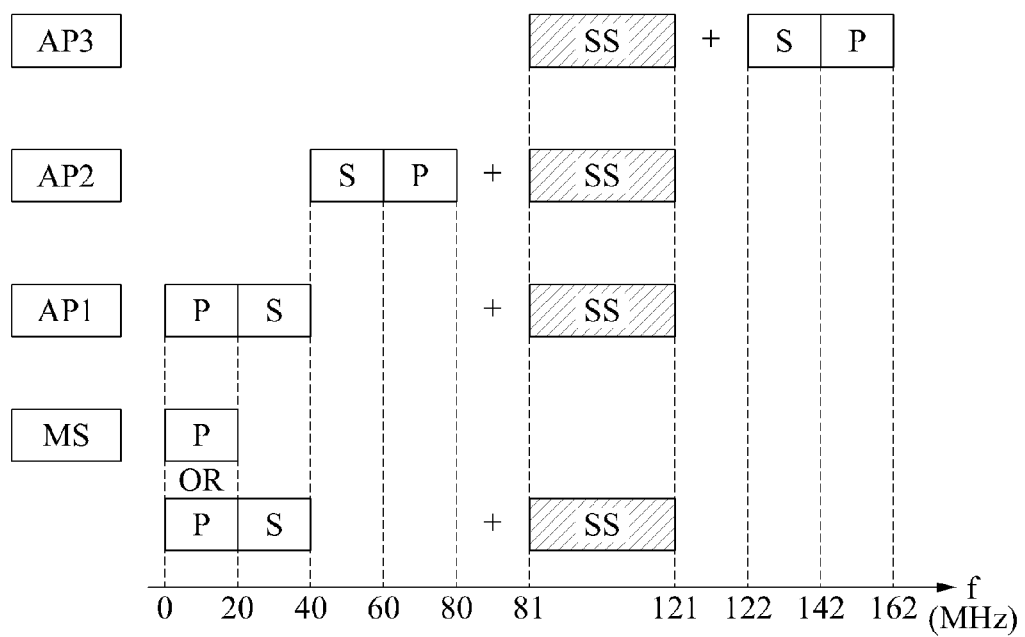

FIG. 6
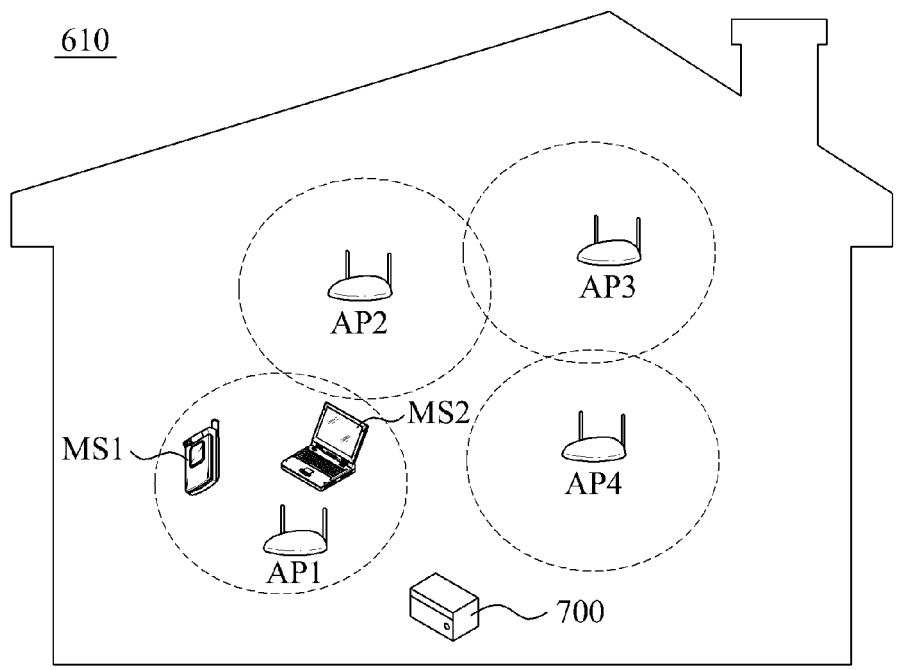
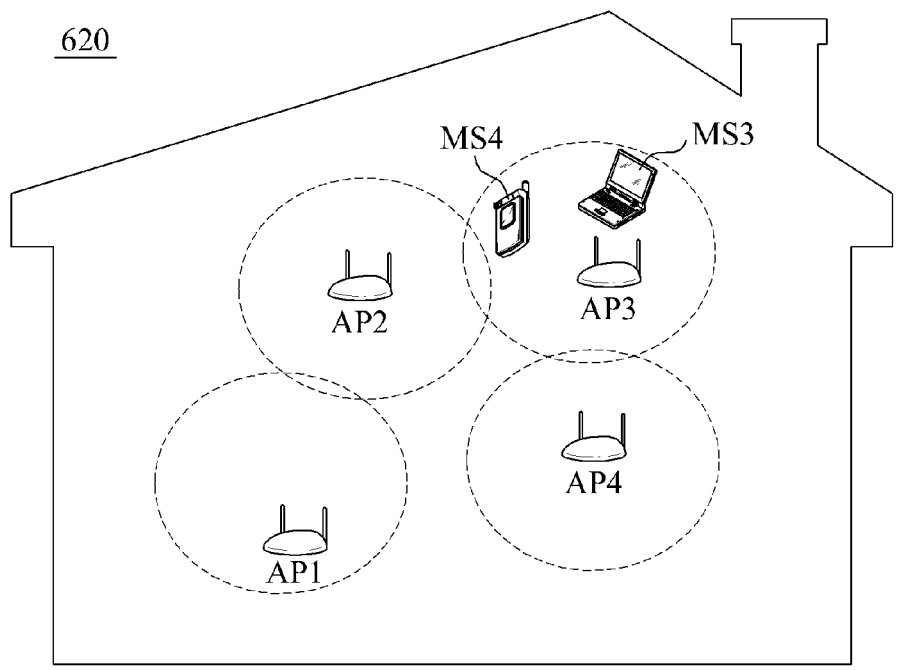

FIG. 8

| FRAME CONTROL | DURATION | RA | SS INFO | FCS |

| TYPE VALUE b3 TO b2 | TYPE DESCRIPTION | SUBTYPE VALUE b7~b4 | SUBTYPE DESCRIPTION |
|---|---|---|---|
| 11 | RESERVED | 0100 | CTS-SELF-EXTENSION |

FIG. 9

| FRAME CONTROL | DURATION | RA | BSSID | FCS |

| TYPE VALUE b3 TO b2 | TYPE DESCRIPTION | SUBTYPE VALUE b7~b4 | SUBTYPE DESCRIPTION |
|---|---|---|---|
| 11 | RESERVED | 0010 | CF-END-RETURN |

FREQUENCY BAND SETTING APPARATUS AND METHOD, ACCESS POINT, AND FREQUENCY BAND USING METHOD OF ACCESS POINT

CROSS-REFERENCE TO RELATED APPLICATION(S)

This application claims the benefit under 35 U.S.C. §119 (a) of Korean Patent Application No. 10-2009-0087532, filed on Sep. 16, 2009, in the Korean Intellectual Property Office, the entire disclosure of which is incorporated herein by reference for all purposes.

BACKGROUND

1. Field

The following description relates to a technology for setting a common frequency band that may be shared by a plurality of access points, and additionally, to a frequency band setting apparatus and method, an access point, and a frequency band using apparatus of the access point.

2. Description of the Related Art

A next-generation wireless Local Area Network (LAN) may be used in an indoor environment. In an environment in which a next-generation wireless LAN is used, traffic volume may vary depending on a service type such as a voice, a multimedia, and the like, and use various bands depending on a service type.

Since a plurality of Access Points (APs) are installed indoors, a few high frequency bands in a GHz range may be used, and the APs are to use different channels of wide bands. Accordingly, the same number of channels for different bands as the number of APs are required to simultaneously use the plurality of APs indoors.

However, when a variety of traffics exist as described above, assigning a significant amount of bandwidth to every AP may waste frequency resources, and reduce the number of channels that may be simultaneously assigned to the plurality of APs. Accordingly, a technology that may maximize a frequency use, and enable each AP and a mobile station to occupy a desired frequency band is desired.

SUMMARY

In one general aspect, there is provided a frequency band setting apparatus, including: a calculation unit configured to calculate a basic frequency band of each of a plurality of Access Points (APs), and a control unit configured to divide a frequency band, the frequency band being available to the plurality of APs, into each of the calculated basic frequency bands and a common frequency band.

The frequency band setting apparatus may further include that the control unit is further configured to divide the available frequency band to enable the common frequency band to be contiguous with the basic frequency bands of the plurality of APs.

The frequency band setting apparatus may further include that the control unit is further configured to divide the available frequency band to enable the common frequency band to be non-contiguous with at least one of the basic frequency bands of the plurality of APs.

In another general aspect, there is provided an Access Point (AP), including: a communication unit configured to receive a request for assignment of a required frequency band from a Mobile Station (MS), and a control unit configured to: compare a bandwidth of the required frequency band with a bandwidth of a basic frequency band for the AP, and in response to the bandwidth of the required frequency band being greater than the bandwidth of the basic frequency band, assign a common frequency band, shared by a plurality of APs, to the MS.

The AP may further include that the control unit is further configured to assign an entire common frequency band or a portion of the common frequency band, depending on the bandwidth of the required frequency band.

The AP may further include that the common frequency band is set by the control unit or a network controller.

The AP may further include that: in response to the common frequency band being set by the network controller, the communication unit is further configured to: request the network controller for use of the set common frequency band, and receive a token from the network controller, the token allowing the set common frequency band to be used, and the control unit is further configured to assign the set common frequency band to the MS in response to the receipt of the token.

The AP may further include that, in response to the use of the common frequency band being completed, the communication unit is further configured to return the token to the network controller.

The AP may further include that: the control unit is further configured to calculate the basic frequency band of the AP based on a frequency band for a plurality of MSs, the plurality of MSs configured to communicate with the AP, the communication unit is further configured to request a network controller to assign the calculated basic frequency band, and the network controller is further configured to assign the basic frequency band and the common frequency band.

The AP may further include that the control unit or the network controller is further configured to divide a frequency band, which is available to the plurality of APs, into the common frequency band and a basic frequency band of each of the plurality of APs.

In another general aspect, there is provided a frequency band setting method, including: calculating a basic frequency band of each of a plurality of Access Points (APs), and dividing a frequency band, which is available to the plurality of APs, into each of the calculated basic frequency bands and a common frequency band.

The frequency band setting method may further include that the dividing of the frequency band includes dividing the available frequency band to enable the common frequency band to be contiguous with the basic frequency bands of the plurality of APs.

The frequency band setting method may further include that the dividing of the frequency band includes dividing the available frequency band to enable the common frequency band to be non-contiguous with at least one of the basic frequency bands of the plurality of APs.

In another general aspect, there is provided a method of using a common frequency band of an Access Point (AP), the method including: receiving a request for assignment of a required frequency band from a Mobile Station (MS), and comparing a bandwidth of the required frequency band with a bandwidth of a basic frequency band for the AP, and assigning a common frequency band, shared by a plurality of APs, to the MS in response to the bandwidth of the required frequency band being greater than the bandwidth of the basic frequency band.

The method may further include that the common frequency band, assigned to the MS, varies depending on the bandwidth of the required frequency band.

The method may further include that the common frequency band is set by the AP or a network controller.

The method may further include that, in response to the common frequency band being set by the network controller, the assigning of the common frequency band includes: requesting the network controller for use of the set common frequency band, receiving a token from the network controller, the token allowing the set common frequency band to be used, and assigning the common frequency band to the MS in response to the receipt of the token.

The method may further include, in response to the use of the common frequency band being completed, returning the token to the network controller.

The method may further include: calculating the basic frequency band of the AP based on a frequency band for a plurality of MSs, requesting a network controller to assign the calculated basic frequency band, and receiving the basic frequency band and the common frequency band from the network controller.

The method may further include that the network controller or the AP divides a frequency band, which is available to the plurality of APs, into the common frequency band and a basic frequency band of each of the plurality of APs.

In another general aspect, there is provided a computer-readable recording medium storing a program for implementing a frequency band setting method, the method including: calculating a basic frequency band of each of a plurality of APs, and dividing a frequency band, which is available to the plurality of APs, into each of the calculated basic frequency bands and a common frequency band.

Other features and aspects may be apparent from the following detailed description, the drawings, and the claims.

BRIEF DESCRIPTION OF THE DRAWINGS

FIG. 3 is a diagram illustrating an example of a common frequency band contiguous with a basic frequency band of an AP, and an example of a common frequency band which is not contiguous with a basic frequency band of an AP.

FIG. 6 is a diagram illustrating an example of an indoor environment in which an example of an AP and an example of a network controller are included, and an example of an indoor environment in which an example of an AP is included.

FIG. 8 is a diagram illustrating an example of a format of a Clear To Send (CTS)-Self-Extension frame.

FIG. 9 is a diagram illustrating an example of a format of a Contention Free (CF)-End-Return frame.

Figure 1:
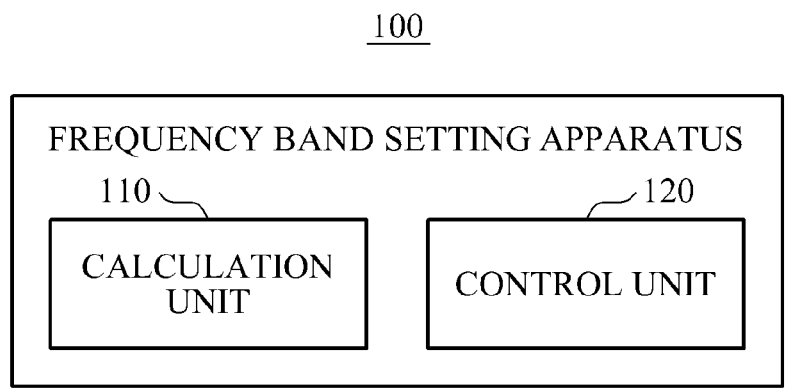
FIG. 1 is a diagram illustrating an example of a configuration of a frequency band setting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a to comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a configuration of a frequency band setting apparatus 100.

The frequency band setting apparatus 100 may be installed in an indoor environment, and may provide at least one common frequency band that may be shared by a plurality of Access Points (APs) installed in the indoor network environment. The frequency band setting apparatus 100 may be each of the APs, or a network controller that may be applied to a home gateway. However, in response to the frequency band setting apparatus 100 being the network controller, the frequency band setting apparatus 100 may provide a function of a control unit 120 only.

Referring to the example in FIG. 1, the frequency band setting apparatus 100 may include a calculation unit 110 and the control unit 120. The calculation unit 110 may calculate a basic frequency band, required by each of the plurality of APs, based on an effective rate. Calculation of the basic frequency band (E1' through EN') based on the effective rate is described below. For example, N may be a positive number.

Figure 2:
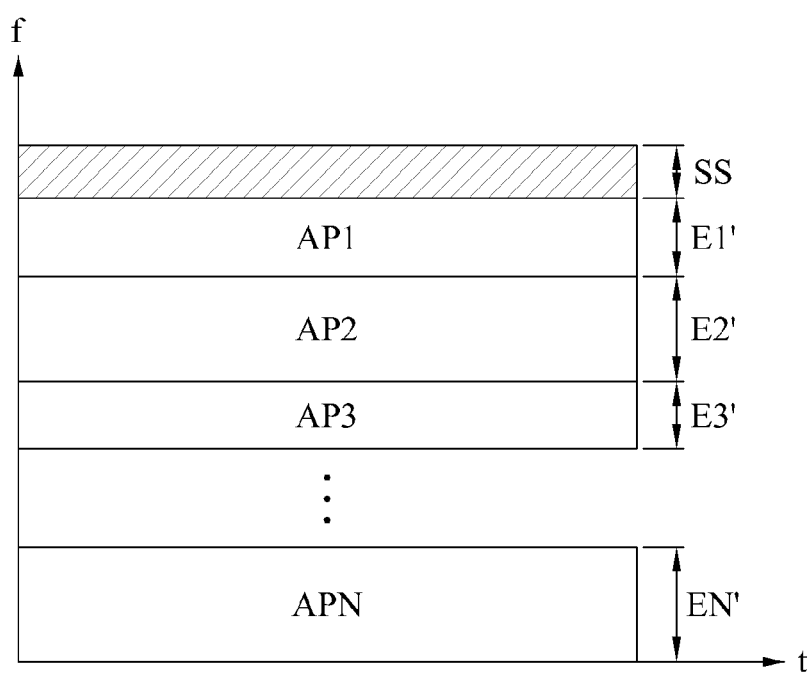
FIG. 2 is a diagram illustrating examples of a basic frequency band and a common frequency band of each Access Point (AP).

Referring to the example shown in FIG. 2, the control unit 120 may divide a frequency band, that may be available to a plurality of APs, into a common frequency band and a calculated basic frequency band (E1', E2' ..., EN') of each of the plurality of APs. For example, the plurality of APs may include a first AP (AP1) through an $N^{th}$ AP (APN). In FIG. 2, "t" denotes time, and "f" denotes a frequency.

For example, the control unit 120 may set a remaining frequency band excluding each basic frequency band as the common frequency band, or divide a frequency band into each basic frequency band after assigning a predetermined common frequency band. The common frequency band may be represented as a Shared Spectrum (SS).

In response to an amount of a frequency required by a Mobile Station (MS) accessing the APN being greater than a basic frequency band set in the APN, the control unit 120 may assign a predetermined SS to the MS accessing the APN. Accordingly, in response to a large amount of traffic occurring in the MS, the MS may use the predetermined SS, which may be set to be shared by the plurality of APs, and may smoothly provide a service.

FIG. 3 illustrates an example 310 of an SS contiguous with a basic frequency band of an AP, and an example 320 of an SS which is non-contiguous with a basic frequency band of an AP.

The control unit 120 may set an SS to enable the SS to be contiguous with a basic frequency band of each of a plurality of APs including an AP1 through an APN. That is, as illustrated in the example 310 of FIG. 3, the control unit 120 may set the SS between the basic frequency band of the AP1 and the basic frequency band of the AP2 to enable an edge of each of the SS and each of the basic frequency bands to be overlapped with each other.

Referring to the example 310 of FIG. 3, the control unit 120 may set the basic frequency band of the AP1 in 0 through 40 MHz, the basic frequency band of the AP2 in 80 through 120 MHz, and the SS in 40 through 80 MHz between the basic frequency band of the AP1 and the basic frequency band of the AP2. An MS, located in an area of the AP1, may use a portion channel of the AP1, for example, 0 through 20 MHz, or an entire channel of the AP1, for example, 0 through 40 MHz.

In an Institute of Electrical and Electronics Engineers (IEEE) 802.11x standard, a basic frequency band of an AP may be classified into a primary channel (P) and a secondary channel (S). In this case, the control unit 120 may set a primary channel of the AP1 and a primary channel of the AP2 at peripheral ends of a frequency, and set an SS between a secondary channel of the AP1 and a secondary channel of the AP2.

Also, the control unit 120 may set an SS to enable the SS to be non-contiguous with at least one of basic frequency bands of the plurality of APs including the AP1 through the APN. That is, as illustrated in the example 320 of FIG. 3, the control unit 120 may set the basic frequency bands of the plurality of APs such that the basic frequency bands do not overlap with each other, and set the SS such that the SS does not overlap with each of the basic frequency bands.

Referring to the example 320 of FIG. 3, the control unit 120 may set each of the basic frequency bands, that is, 0<the basic frequency band of the AP1≤40 MHz, 40 MHz≤the basic frequency band of the AP2≤80 MHz, and 142 MHz≤the basic frequency band of the AP3≤162 MHz. Also, the control unit 120 may set a predetermined SS, for example, 81 MHz≤SS≤121 MHz. However, the basic frequency bands and the SS may not be limited to the examples.

Figure 4:
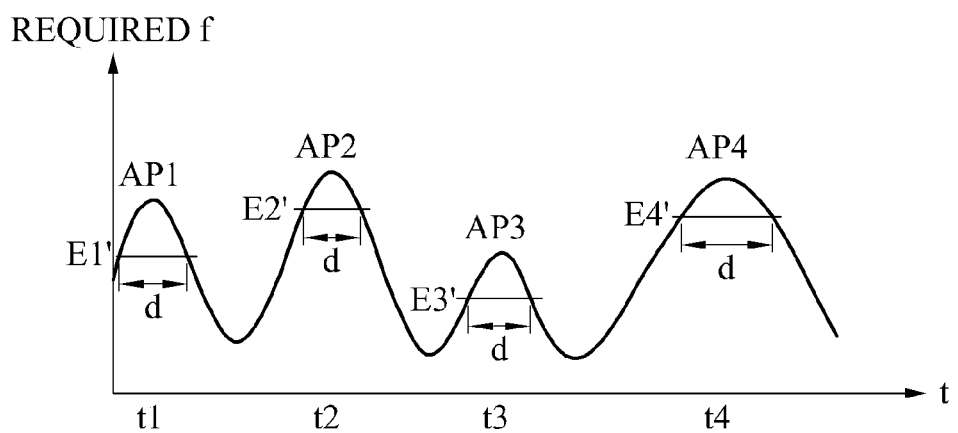
FIG. 4 is a graph illustrating an example in which a plurality of APs uses a common frequency band at every predetermined time.
Figure 5:
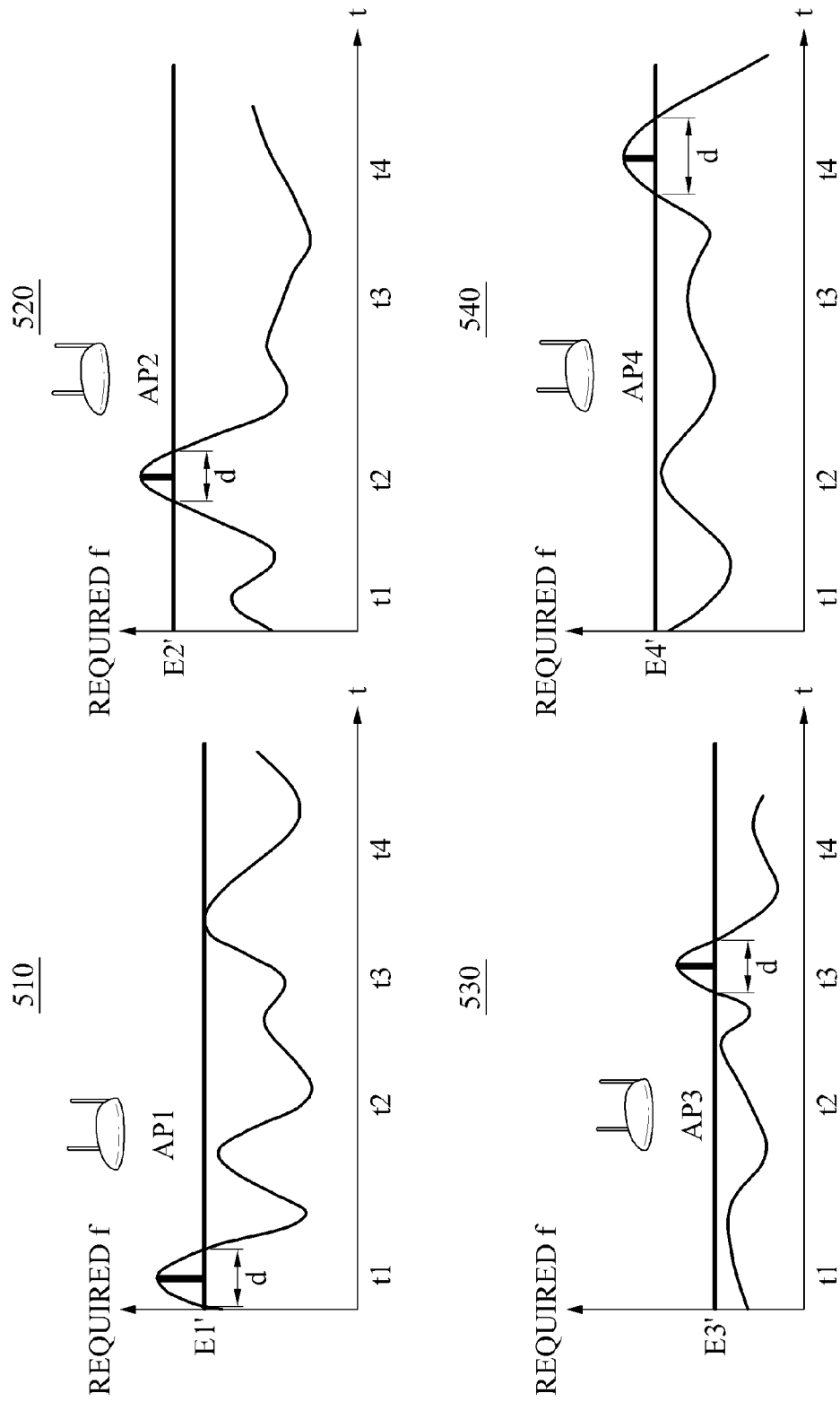
FIG. 5 shows graphs illustrating examples in which each of the plurality of APs of FIG. 4 occupies a common frequency band.

FIG. 4 illustrates an example in which a plurality of APs uses an SS at a predetermined time. FIG. 5 illustrates examples in which each of the APs of FIG. 4 occupies an SS.

Referring to FIG. 4 and FIG. 5, "required f" denotes a frequency required by an MS or an AP, and "t" denotes a time. Also, an AP1, an AP2, an AP3, and an AP4 may denote a first AP, a second AP, a third AP, and a fourth AP, respectively.

Also, E1', E2', E3', and E4' may denote a basic frequency band of each of the AP1, the AP2, the AP3, and the AP4, based on an effective rate.

An AP, that requires a bandwidth greater than a bandwidth of a basic frequency band, may use an SS, which is set as described above, using a random access scheme, and may acquire a bandwidth for service. In response to the AP1, the AP2, the AP3, and the AP4 requiring the SS, the AP1, the AP2, the AP3, and the AP4 may use the SS at every predetermined time. That is, each of the AP1, the AP2, the AP3, and the AP4 may occupy the SS during each "d" time period. Each of the "d" time periods and the SS, illustrated in FIG. 4, may be identical to or different from each other.

FIG. 6 illustrates one example 610 of an indoor environment in which an AP and a network controller 700 are included, and another example 620 of an indoor environment in which an AP is included.

In the indoor environment of the example 610, the network controller 700 may set a basic frequency band of each of an AP1, an AP2, an AP3, and an AP4, and set an SS which may be shared by the AP1, the AP2, the AP3, and the AP4. For example, the AP1, the AP2, the AP3, and the AP4 may be included in the indoor environment. Hereinafter, the AP1 is described as an example.

Figure 7:
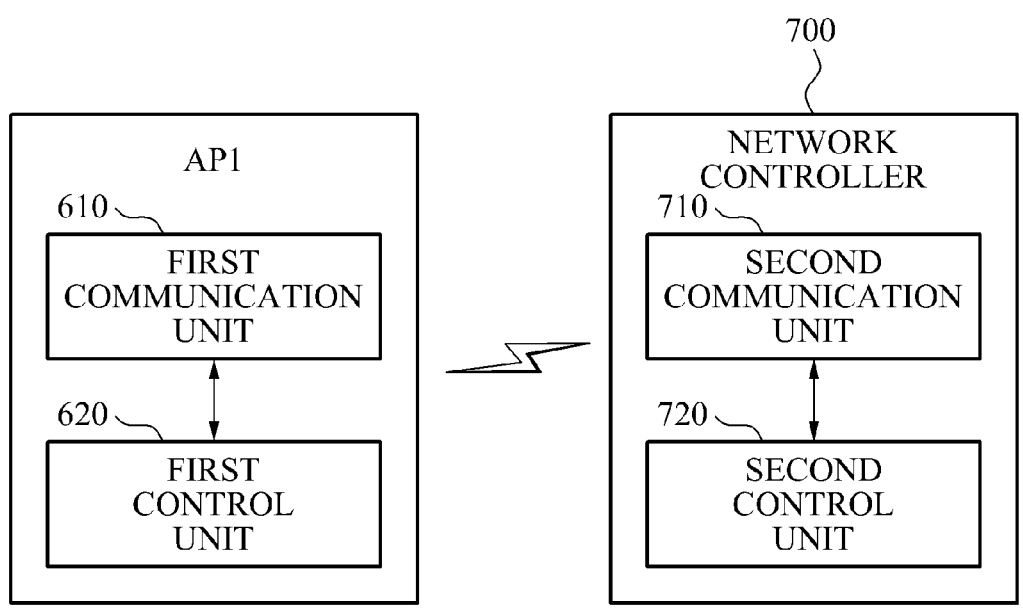
FIG. 7 is a diagram illustrating an example of a configuration of a first AP and the network controller of FIG. 6.

FIG. 7 illustrates an example of a format of the AP1 and the network controller 700 of FIG. 6.

The AP1 may be installed in a house, an office, and the like, and enable wired/wireless communication of at least one MS. In the example shown in FIG. 7, the AP1 includes a first communication unit 610 and a first control unit 620.

The first communication unit 610 may be an interface module supporting communication. Also, the first communication unit 610 may perform wired/wireless communication with the network controller 700 and the MSs located in an area controlled by the AP1. The MS1 and the MS2 may be a device for wired/wireless communication such as a mobile phone, a laptop, a notebook computer, and the like. However, the MS1 and MS2 are not limited to the above examples.

Hereinafter, an example of a method in which the network controller 700 sets a basic frequency band of the AP1 and an SS which is shared by a plurality of APs including the AP1, an AP2, an AP3, and an AP4 is described.

In an initial stage, for example, in response to power being turned on, or in response to a new AP being installed, each of the MS1 and MS2 may calculate a required frequency bandwidth used for communication, and transmit an event requesting the AP1 for the required frequency bandwidth. The event may include an amount of frequency bandwidth required by each of the MS1 and MS2.

In response to the first communication unit 610 receiving the event from each of the MS1 and MS2, the first control unit 620 may calculate a basic frequency band E1' to be used by the AP1, using the bandwidth used by each of the MS1 and MS2. The basic frequency band may be an effective rate, which is an average value of the bandwidths used by the MS1 and MS2.

Also, the first control unit 620 may calculate a basic frequency band, that is, the effective rate, from $X_i$ satisfying $$Prob\left\{\sum_{i=1}^{N} X_i > C\right\} \le e^{-\gamma}.$$

For example, $X_i$, N, C, and $\gamma$ respectively denote a bandwidth required by an $i^{th}$ MS, a number of MSs connected to the AP1, an available bandwidth of the AP1, and an outage ratio. The outage ratio may indicate a ratio that an MS may not be provided with service.

The first control unit 620 may control the first communication unit 610 to request the network controller 700 to assign the basic frequency band. The first control unit 620 may receive the assigned basic frequency band E1' of the AP1 from the network controller 700, and be provided with information about an SS. The first control unit 620 may divide the assigned basic frequency band E1' into the frequency band, requested by each of the MS1 and MS2, and assign the divided frequency band to the MS1 and the MS2.

Also, the network controller 700 may function as a home gateway, and include a second communication unit 710 and a second control unit 720. As the second control unit 720 is similar to the control unit 120 of FIG. 1, description of the second control unit 720 is omitted.

The second communication unit 710 may be an interface module supporting wired/wireless communication with the plurality of APs including the AP1, the AP2, the AP3, and the AP4. Also, the second communication unit 710 may receive an event requesting an assignment of a basic frequency band from the plurality of APs.

As described above with reference to FIG. 2 and the example 320 of FIG. 3, the second control unit 720 may divide a frequency band, which is available to the plurality of APs, into an SS and a basic frequency band (E1', E2', E3' and E4') of each of the plurality of APs.

Alternatively, the second control unit 720 may assign a basic frequency band, requested by the AP1, and designate a location of a predetermined amount of SS, that is, a frequency range. An example of a method in which the second control unit 720 assigns and sets the basic frequency band and the SS has been described above.

The second control unit 720 may assign the set basic frequency band to the AP1, and provide information about the SS to the AP1.

As described above, the SS, which may be shared by each of the plurality of APs, may be assigned by the network controller 700. Accordingly, in response to each of the APs requiring a frequency greater than the basic frequency band, a service may be provided by using the SS.

A method of using an SS after assigning the basic frequency band is described below.

After a bandwidth of a frequency band for a data service is calculated, an MS1 may transmit an event, requesting a bandwidth of a required frequency band, to the AP1.

The first control unit 620 may calculate a basic frequency band, that is, an effective rate, based on the event received from the first communication unit 610. The first control unit 620 may confirm a frequency bandwidth, required by the MS1, from the received event, and compare the required frequency bandwidth with a bandwidth of the calculated basic frequency band. In response to the required frequency bandwidth being greater than the bandwidth of the basic frequency band, the first control unit 620 may control the first communication unit 610 to request the network controller 700 for use of the SS.

The network controller 700 may confirm whether the SS is used by another AP in response to the request from the AP1. In response to it being determined that the SS is not used by the other AP, the network controller 700 may transmit a token to the AP1. The token may allow the use of the SS.

The first control unit 620 may occupy the SS in response to the token being received, and report to the MS1 that the SS is occupied. The first control unit 620 may include a clear to send (CTS)-self-extension frame, illustrated in the example of FIG. 8, in a beacon field, and broadcast the CTS-self-extension frame to the MS1. In this instance, the first control unit 620 may assign a portion of or entire SS depending on the bandwidth of the frequency band required by the MS1.

Referring to FIG. 8, the CTS-self-extension frame may be based on an IEEE 802.11x standard. A duration field may include information about a time that the SS is occupied, a receiver address (RA) field may include information about an address of the AP1, and an SS information field may include information about the SS such as a frequency location and a bandwidth. Also, a Frame Check Sequence (FCS) field may be for an error extraction, and a frame control field may define a type of a current frame, for example, a subtype description field, and the like.

The MS1 may extract the CTS-self-extension frame through a Carrier Sensing (CS) that periodically senses the AP1. The MS1 may confirm the SS by parsing the CTS-self-extension frame, and perform random access to the SS.

In response to the SS being completely used and another frequency bandwidth being required, the MS1 may request the AP1 for a required frequency bandwidth.

In response to the other frequency bandwidth being less than or equal to the bandwidth of the basic frequency band, the first control unit 620 may generate a CF-End-Return frame, as illustrated in the example of FIG. 9, and broadcast the generated CF-End-Return frame to the MS1 to report that the occupied SS is released. FIG. 9 illustrates an example of a configuration of the CF-End-Return frame. A Basic Service Set Identifier (BSSID) may indicate an identifier (ID) of a wireless cell, BSS, formed based on the AP1.

Also, the first control unit 620 may return the token, received from the network controller 700, to the network controller 700. The request, use, and return of the token may be performed based on a unit of a time slot.

Alternatively, in response to it being confirmed that the duration ended while the MS1 uses the SS, the first control unit 620 may report that the use of the SS is released by broadcasting the CF-End-Return frame to the MS1. For example, the duration may be set in the CTS-self-extension frame.

Figure 10:
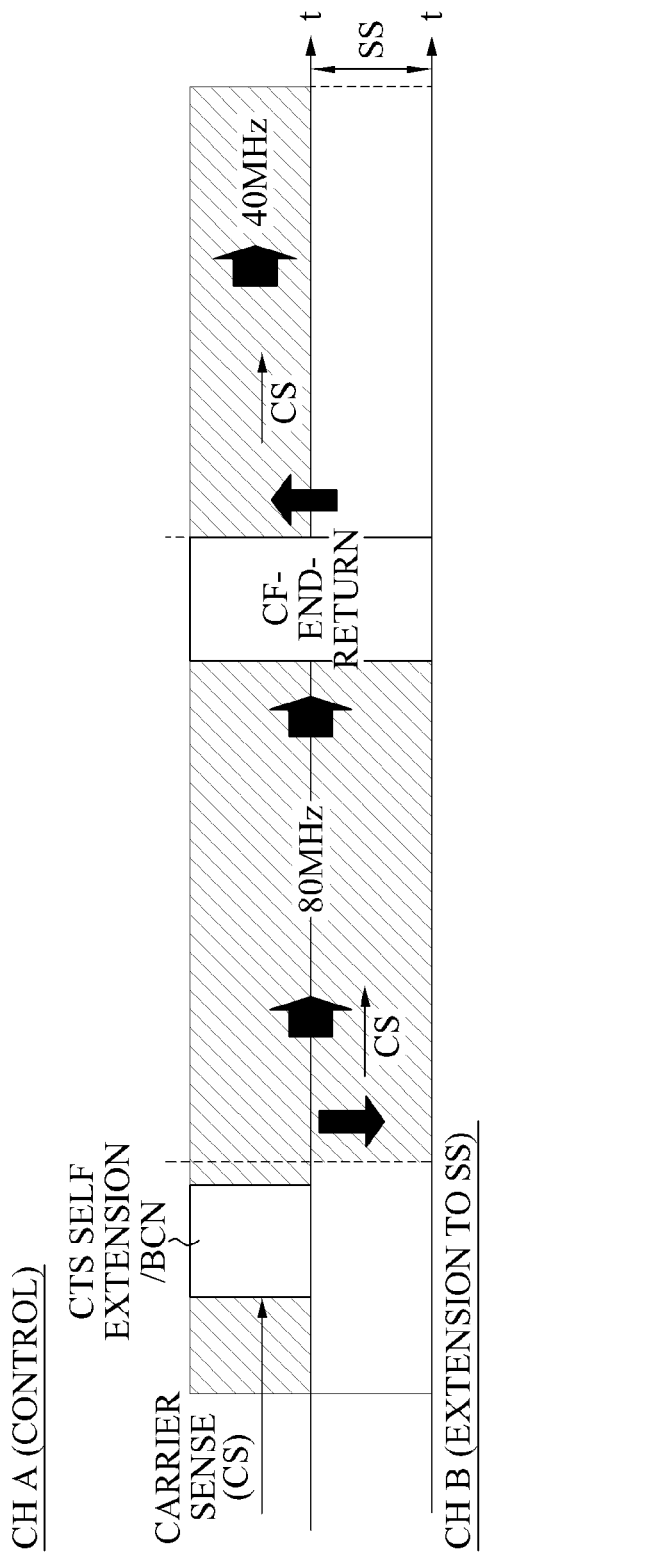
FIG. 10 is a diagram illustrating an example of an operation in which a first AP occupies and releases a common frequency band.

FIG. 10 illustrates an example of an operation in which a first AP occupies and releases a common frequency band. Referring to FIG. 10, a Ch A (control) may be a channel corresponding to a frequency band used by an MS1, and a Ch B (extension to SS) may be a channel corresponding to a frequency band extended by an SS.

An AP1 may report to the MS1 that the SS is occupied by broadcasting a CTS-self-extension frame, and provide the MS1 with information about the SS, that is, a shared channel. Accordingly, the MS1 may parse the CTS-self-extension frame by sensing the CTS-self-extension frame through CS operation, and use the SS. That is, the MS1 may use a bandwidth, e.g., 80 MHz, which is extended from a previous bandwidth of 40 MHz. In response to the MS1 finishing using the SS, the AP1 may broadcast a CF-end-return frame. In response to the CF-end-return frame being sensed through the CS operation, the MS1 may use the previously used bandwidth, e.g., 40 MHz.

In response to a network controller not existing, as illustrated in the example 620 of FIG. 6, a method may be performed in which an AP determines a basic frequency band of the AP as described in detail with reference to FIG. 11. In this instance, an AP3 is described as an example.

Figure 11:
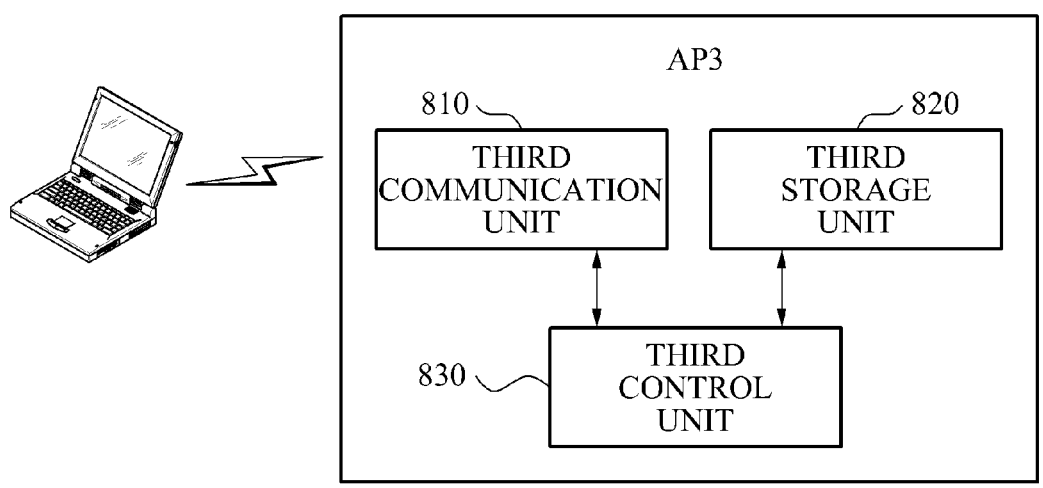
FIG. 11 is a diagram illustrating an example of a configuration of a third AP.

FIG. 11 illustrates an example of a configuration of AP3.

In FIG. 11, the AP3 includes a third communication unit 810, a third storage unit 820, and a third control unit 830. The third control unit 830 may be nearly identical to the calculation unit 110 and the control unit 120 that has been described with reference to FIG. 1. Accordingly, a description of an operation of determining a basic frequency band is omitted.

In the initial stage described above, each of an MS3 and MS4 may calculate a frequency bandwidth E3 for communication, and request the AP3 for the required frequency bandwidth.

The third communication unit 810 may receive an event from the MS3.

The third storage unit 820 may store information of an SS, which may be shared by a plurality of APs in an indoor environment in which the AP3 is installed. For example, the plurality of APs may include an AP1, an AP2, and the AP3, and an AP4. The SS may be set by an AP, which is set as a master of the plurality of APs, such as the AP3.

The third control unit 830 may parse an event, received from the MS3, and confirm a bandwidth of a frequency band required by each of the MS3 and MS4. The third control unit 830 may calculate a basic frequency band or a bandwidth of the basic frequency band of each of the plurality of APs, based on the confirmed frequency bandwidth. And, the third control unit 830 may divide a frequency band, which may be used by the plurality of APs, into the basic frequency band of the AP3 and the SS. For this, the plurality of APs may share information about each of the set basic frequency bands through communication.

Hereinafter, an example of the operation of providing the MS3 and the MS4 with the SS after assigning the basic frequency band of the AP3 is described. An MS, for example, the MS3, may calculate a bandwidth of a frequency band for a data service, and transmit an event, requesting a required bandwidth, to the AP3.

The third control unit 830 may calculate a basic frequency band or a bandwidth of the basic frequency band for the AP3 based on the event received by the third communication unit 810. In response to a bandwidth of a frequency band required by the AP3 being greater than the calculated bandwidth of the basic frequency band for the AP3, the third control unit 830 may assign the basic frequency band and a predetermined SS to the MS3. In one example, the third control unit 830 may broadcast a frame with a format illustrated in FIG. 8. In response to the occupied SS being released, the third control unit 830 may broadcast a frame with a format illustrated in FIG. 9 to the MS3.

Hereinafter, an example of a method of assigning a frequency band is described.

Figure 12:
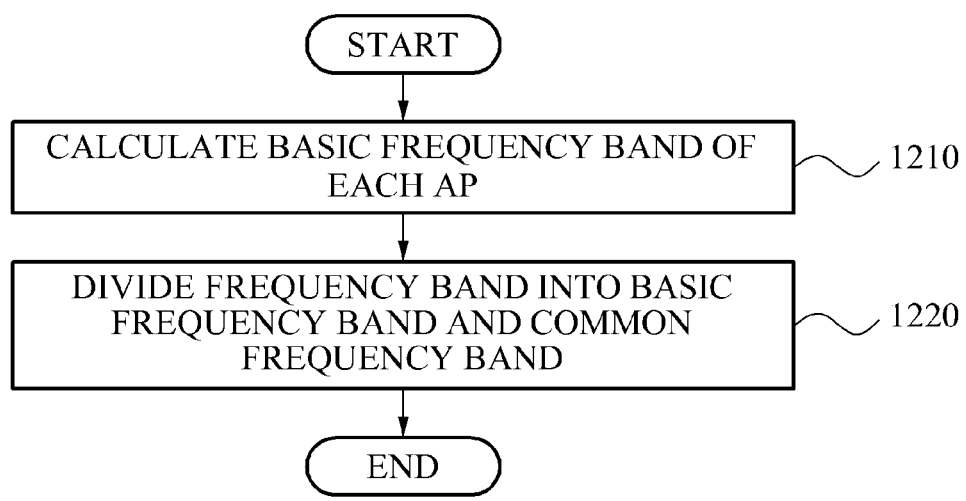
FIG. 12 is a flowchart illustrating an example of a frequency band setting method of a frequency band setting apparatus.

FIG. 12 illustrates an example of a frequency band setting method of a frequency band setting apparatus.

In operation 1210, a calculation unit 110 calculates a basic frequency band of each of a plurality of APs based on an effective rate. The plurality of APs may include an AP1, an AP2, an AP3, and an AP4 installed in an indoor environment.

In operation 1220, a control unit 120 divides a frequency band, that may be available to the plurality of APs, into a common frequency band and each of the calculated basic frequency bands, E1', E2', E3' and E4'. An operation of dividing has been described above with reference to FIG. 2 through FIG. 5.

Each of the APs or a network controller 700 may perform the calculating in operation 1210 and the dividing in operation 1220.

Figure 13:
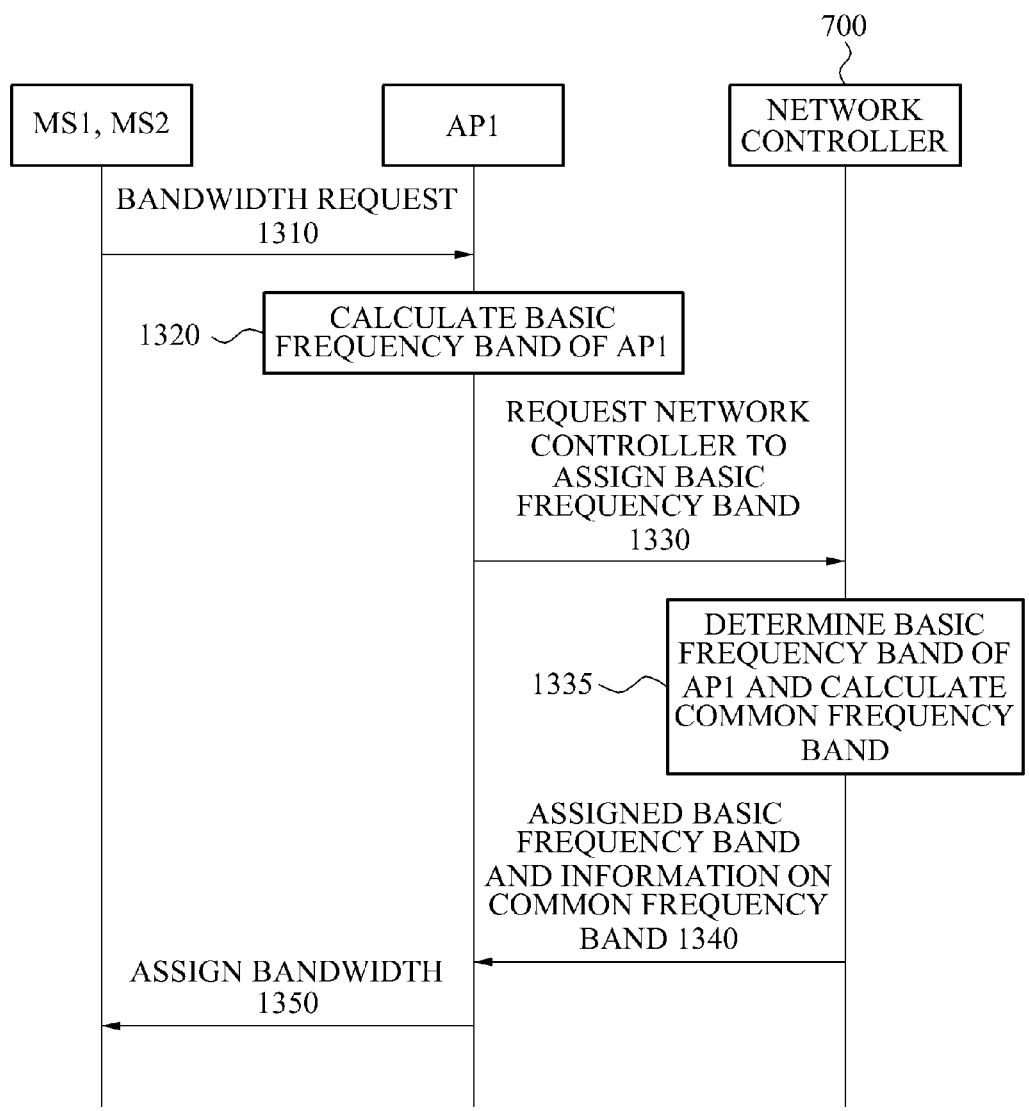
FIG. 13 is a flowchart illustrating an example of a method of determining a basic frequency band of an AP, in which a network controller exists.

FIG. 13 illustrates an example of a method of determining a basic frequency band of an AP, in response to a network controller existing.

In an initial stage, for example, in response to power being turned on, or in response to a new AP being installed, each of an MS1 and MS2 may calculate a required frequency bandwidth for communication. In operation 1310, a first communication unit 610 of an AP1 may receive a request for the required frequency bandwidth from each of the MS1 and MS2.

In operation 1320, a first control unit 620 of the AP1 may calculate a basic frequency band of the AP1 using the used frequency bandwidth requested by each of the MS1 and MS2.

In operation 1330, the first control unit 620 may control the first communication unit 610 to request a network controller 700 to assign the basic frequency band.

In operation 1335, the network controller 700 may divide a frequency band, that may be available to a plurality of APs, into a common frequency band and a basic frequency band of each of the plurality of APs based on the request in operation 1330. That is, the common frequency band and the basic frequency band of the AP1 may be determined. For example, the plurality of APs may include the AP1, an AP2, an AP3, and an AP4.

In operation 1340, the first control unit 620 may receive the assigned basic frequency band of the AP1 from the network controller 700, and may be provided with information about the common frequency band.

In operation 1350, the first control unit 620 may divide the assigned basic frequency band into a plurality of the bands with the frequency bandwidth, requested by each of the MS1 and MS2, and may assign the band to each of the MS1 and MS2. That is, in operation 1350, the first control unit 620 may assign the bandwidth corresponding to the request received in operation 1310.

Figure 14:
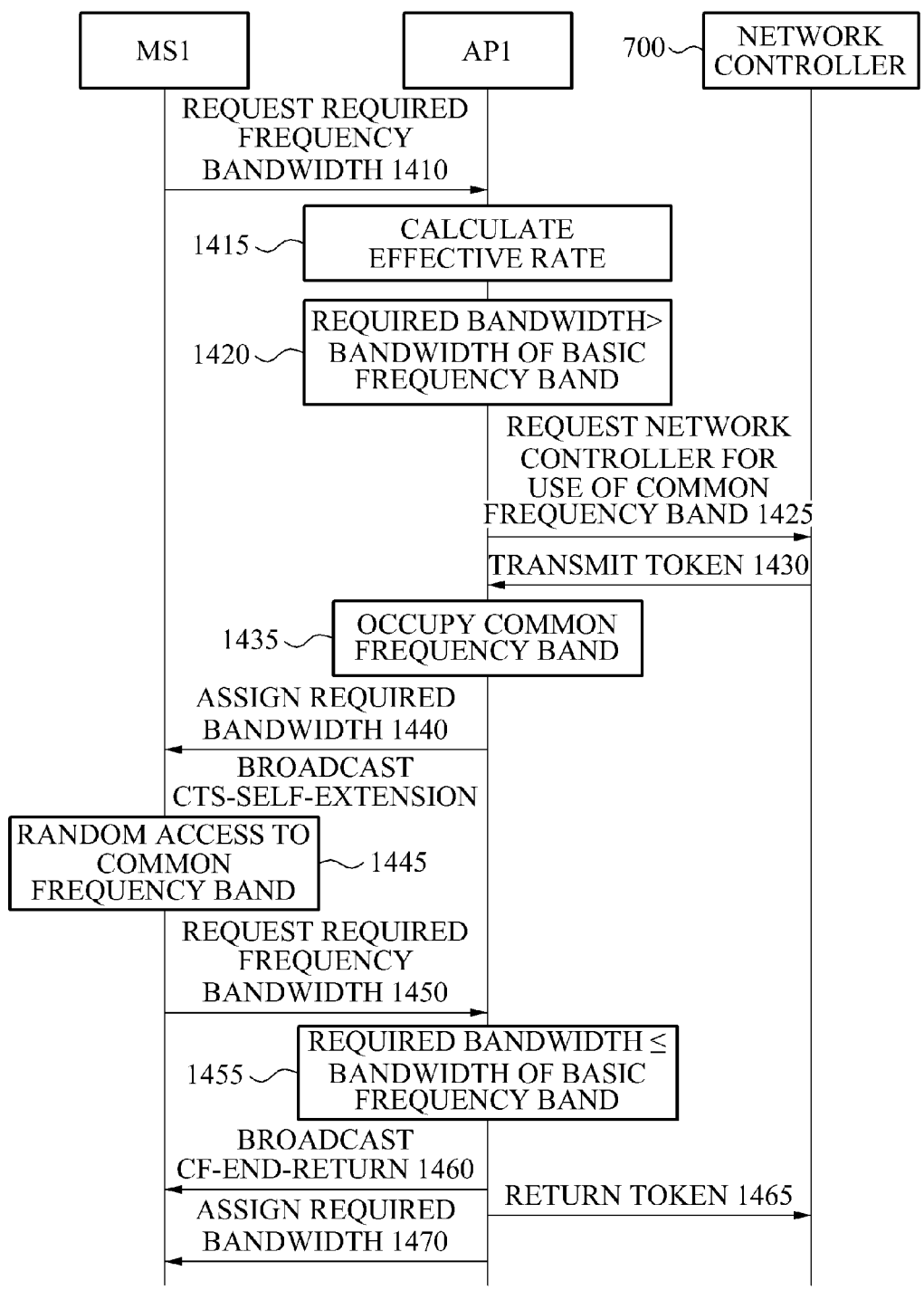
FIG. 14 is a flowchart illustrating an example of a method of using a common frequency band of an AP, in which a network controller exists.

FIG. 14 illustrates an example of a method of using a common frequency band of an AP, in response to a network controller existing.

Referring to FIG. 14, in operation 1410, a first communication unit 610 of an AP1 receives an event, requesting a required frequency bandwidth, from an MS1.

In operation 1415, a first control unit 620 of the AP1 may calculate a bandwidth of a basic frequency band of the AP1 based on the received event. For example, the bandwidth of the basic frequency band may be an effective rate.

In operation 1420, the first control unit 620 may determine whether the required frequency bandwidth is greater than the calculated bandwidth of the basic frequency band. In operation 1425, in response to it being determined that the required frequency bandwidth is greater than the calculated bandwidth of the basic frequency band, the first control unit 620 may request a network controller 700 for use of a common frequency band.

In operation 1430, the first communication unit 610 may receive a token, allowing the common frequency band to be used, from the network controller 700.

In response to the token being received, the first control unit 620 may occupy the common frequency band in operation 1435. In operation 1440, the first control unit 620 may assign the required frequency bandwidth to the MS1. That is, the first control unit 620 may report to the MS1 that the common frequency band is occupied, by broadcasting a CTS-self-extension frame in operation 1440.

The MS1 may confirm a range of the common frequency band from an SS info field, included in the CTS-self-extension frame, and may perform random access to the common frequency band in operation 1445.

In operation 1450, the first communication unit 610 may receive a request for assignment of another required frequency bandwidth from the MS1.

In operation 1455, the first control unit 620 may determine whether the required frequency bandwidth requested by the MS1 is equal to or less than the bandwidth of the basic frequency band. In operation 1460, in response to it being determined that the frequency bandwidth required by the MS1 is equal to or less than the bandwidth of the basic frequency band, the first control unit 620 may report to the MS1 that the occupied common frequency band is released by broadcasting a CF-End-Return frame.

In response to the common frequency band being released, in operation 1465, the first control unit 620 may control the first communication unit 610 to return the token, received from the network controller 700, to the network controller 700.

In operation 1470, the first control unit 620 may assign the required frequency bandwidth, requested by the MS1 in operation 1450, to the MS1.

Alternatively, in response to a duration being finished before requesting in operation 1450, the first control unit 620 may report to the MS1 that the use of the common frequency band is released by broadcasting the CF-End-Return frame. The duration may be set in the CTS-self-extension frame.

Figure 15:
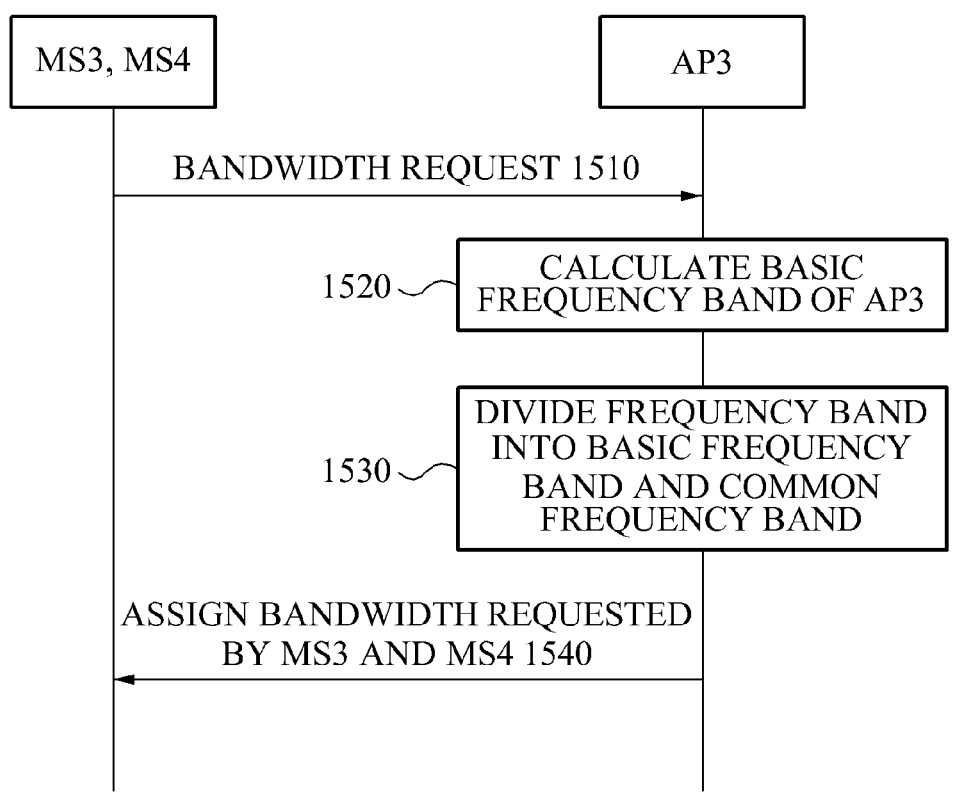
FIG. 15 is a flowchart illustrating an example of a method of determining a basic frequency band of an AP, in which a network controller does not exist.

FIG. 15 illustrates an example of a method of determining a basic frequency band of an AP, in response to a network controller not existing.

In FIG. 15, in an initial stage, for example, in response to power being turned on, or in response to a new AP being installed, each of an MS3 and MS4 may calculate a required frequency bandwidth for communication. In operation 1510, a third communication unit 810 of an AP3 may receive a request for the required frequency bandwidth from each of the MS3 and MS4.

In operation 1520, a third control unit 830 of the AP3 may calculate a bandwidth of a basic frequency band of the AP3 based on the received request for the required frequency bandwidth.

In operation 1530, the third control unit 830 may divides a frequency band, which may be available to a plurality of APs, e.g., AP1, AP2, AP3, and AP4, into a common frequency band and the basic frequency band of the AP3. In one example, the third control unit 830 may leave a bandwidth set based on a basic frequency band to be used by another AP, for example, AP4.

In operation 1540, the third control unit 830 may control the third communication unit 810 to assign the frequency bandwidth requested by each of the MS3 and MS4 in operation 1510.

Figure 16:
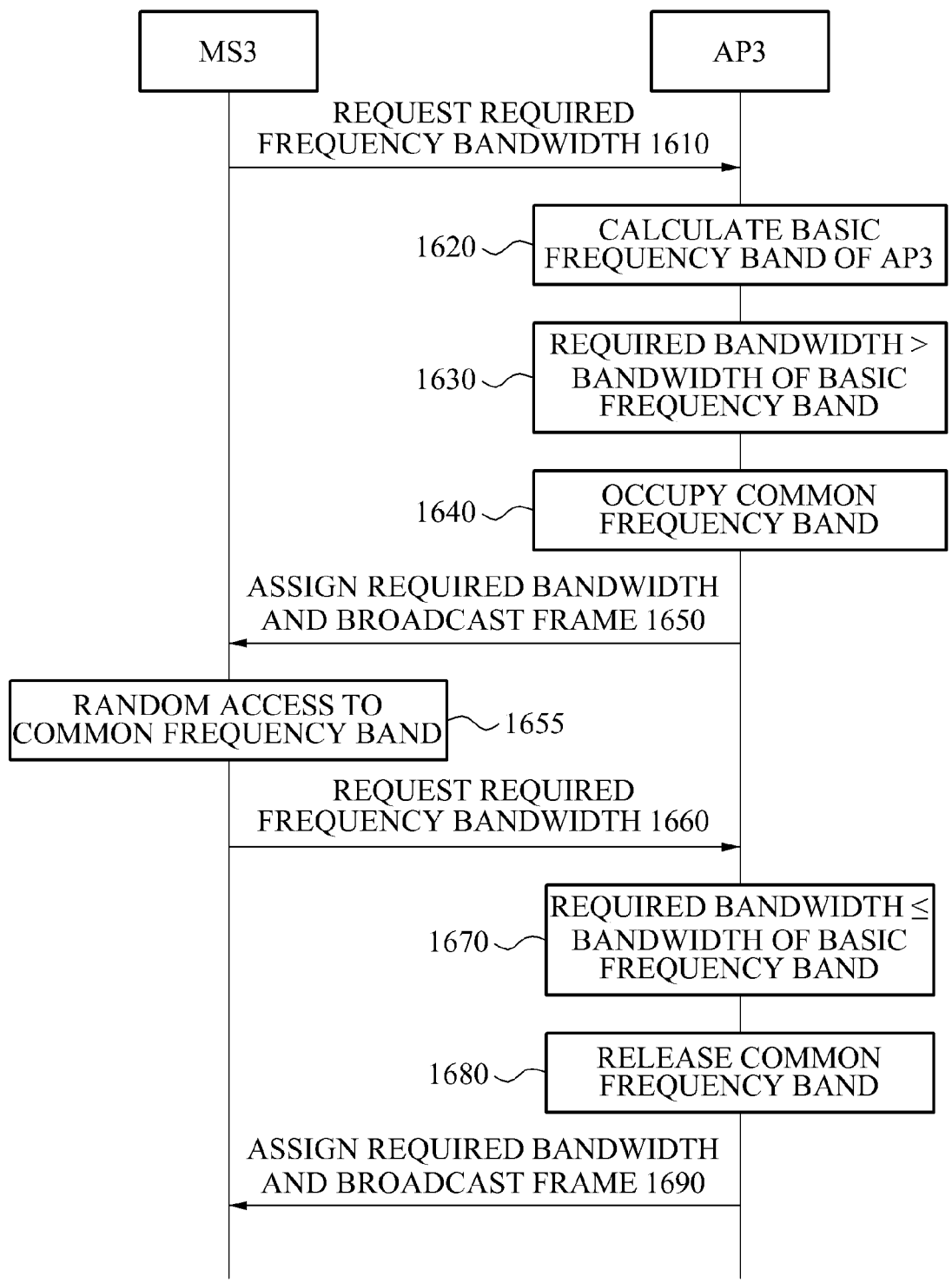
FIG. 16 is a flowchart illustrating an example of a method of using a common frequency band of an AP, in which a network controller does not exist.

FIG. 16 is a flowchart illustrating an example of a method of using a common frequency band of an AP, in response to a network controller not existing.

Referring to FIG. 16, in operation 1610, a third communication unit 810 of an AP3 may receive an event, requesting a required frequency bandwidth, from an MS3.

In operation 1620, a third control unit 830 of the AP3 may calculate a basic frequency band of the AP3 based on the frequency bandwidth required by the MS3.

In operation 1630, the third control unit 830 may determine whether the required frequency bandwidth is greater than a bandwidth of the calculated basic frequency band. In operation 1640, in response to it being determined that the required frequency bandwidth is greater than the calculated bandwidth, the third control unit 830 may occupy a predetermined common frequency band.

In operation 1650, the third control unit 830 may assign the required frequency bandwidth to the MS1 and broadcast a frame of FIG. 8.

The MS3 may perform random access to the common frequency band by parsing a CTS-self-extension frame in operation 1655.

In operation 1660, the third communication unit 810 may receive a request for assignment of another required frequency bandwidth from the MS3.

In operation 1670, the third control unit 830 may determine whether the required frequency bandwidth required by the MS3 is equal to or less than the bandwidth of the basic frequency band. In operation 1680, in response to it being determined that the frequency to bandwidth required by the MS3 is equal to or less than the bandwidth of the basic frequency band, the third control unit 830 may report to the MS3 that the occupied common frequency band is released by broadcasting a CF-End-Return frame.

In operation 1690, the third control unit 830 may assign the required frequency bandwidth, requested by the MS3 in operation 1660, to the MS3.

Alternatively, in response to a duration being finished before the requesting in operation 1660, the third control unit 830 may report to the MS3 that the use of the common frequency band is released by broadcasting the CF-End-Return frame. The duration may be set in the CTS-self-extension frame.

According to some examples, a use rate of a limited frequency may increase by using a common spectrum or a common frequency band in an environment of a limited resource and an environment in which a channel dynamically changes. In particular, an MS requiring a broad bandwidth may efficiently provide a service by using a common frequency band.

Also, a broadband service may be efficiently provided in a next-generation wireless Local Area Network (LAN), and a Quality of Service (QoS) may be guaranteed by using a common frequency band.

Also, in response to a plurality of common frequency bands being set, a plurality of MSs or APs may simultaneously use a common frequency band.

Figure 17:
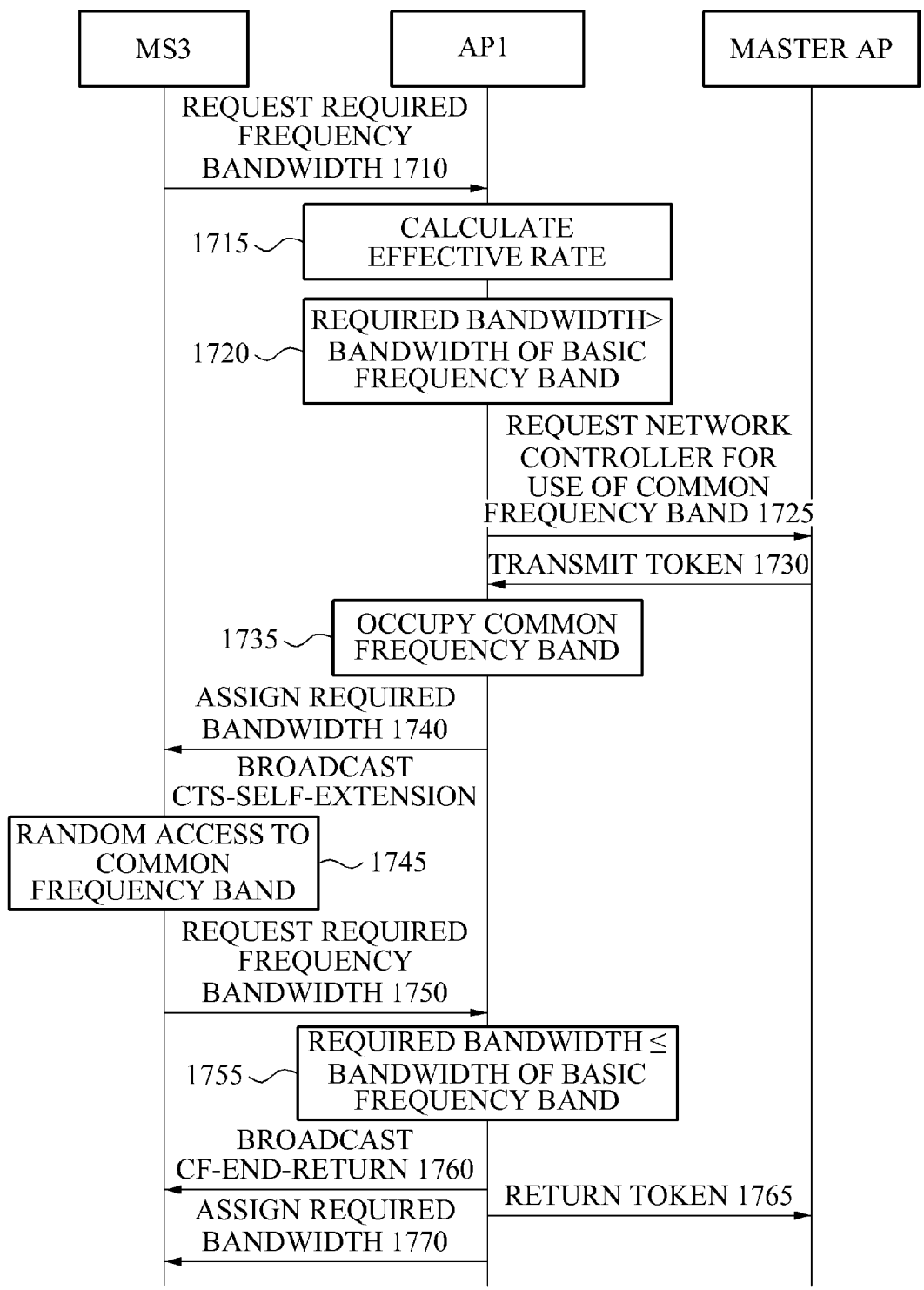
FIG. 17 illustrates an example of a method of assigning, by a master AP, a shared frequency bandwidth to neighboring APs, in which a network controller does not exist.

FIG. 17 illustrates an example of a method of assigning, by a master AP, a shared frequency bandwidth to neighboring APs, in response to a network controller not existing.

In FIG. 17, the master AP may be the AP3 shown in FIG. 6B or FIG. 11, for example, and the neighboring APs may be the AP1, the AP2, and the AP4 shown in FIG. 6B. The master AP may operate in a manner similar to the network controller 700.

Referring to FIG. 17, in operation 1710, one of the AP1 (hereinafter, "the AP1"), the AP2, and the AP4 corresponding to the neighboring APs may receive, from an MS3, an event requesting a required frequency bandwidth.

In operation 1715, the AP1 may calculate a bandwidth of a basic frequency band of the AP1 based on the received event. For example, the bandwidth of the basic frequency band may be an effective rate.

In operation 1720, the AP1 may determine whether the required frequency bandwidth is greater than the calculated bandwidth of the basic frequency band. In operation 1725, in response to it being determined that the required frequency bandwidth is greater than the calculated bandwidth of the basic frequency band, the AP1 may request the master AP (hereinafter, "the AP3") for use of a common frequency band.

In operation 1730, the AP1 may receive a token, allowing the common frequency band to be used, from the AP3.

In response to the token being received, the AP1 may occupy the common frequency band in operation 1735. In operation 1740, the AP1 may assign the required frequency bandwidth to the MS3. That is, the AP1 may report to the MS3 that the common frequency band is occupied, by broadcasting a CTS-self-extension frame in operation 1740.

The MS3 may confirm a range of the common frequency band from an SS info field, included in the CTS-self-extension frame, and may perform random access to the common frequency band in operation 1745.

In operation 1750, the AP1 may receive a request for assignment of another required frequency bandwidth from the MS3.

In operation 1755, the AP1 may determine whether the required frequency bandwidth requested by the MS3 is equal to or less than the bandwidth of the basic frequency band. In operation 1760, in response to it being determined that the frequency bandwidth required by the MS3 is equal to or less than the bandwidth of the basic frequency band, the AP1 may report to the MS3 that the occupied common frequency band is released by broadcasting a CF-End-Return frame.

In response to the common frequency band being released, the AP1 may return the token, received from the AP3, to the AP3 in operation 1765.

In operation 1770, the AP1 may assign the required frequency bandwidth, requested by the MS3 in operation 1750, to the MS3. Accordingly, the MS3 may not use the common frequency band, and may use the basic frequency band.

Alternatively, in response to a duration being finished before requesting in operation 1750, the AP1 may report to the MS3 that the use of the common frequency band is released by broadcasting the CF-End-Return frame. The duration may be set in the CTS-self-extension frame.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media may include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the mobile station described herein may refer to mobile devices such as a cellular phone, a personal digital assistant (PDA), a digital camera, a portable game console, an MP3 player, a portable/personal multimedia player (PMP), a handheld e-book, a portable laptop and/or tablet PC, a global positioning system (GPS) navigation, and devices such as a desktop PC, a high definition television (HDTV), an optical disc player, a set top box, and the like capable of wireless communication or network communication consistent with the disclosure above.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A frequency band setting apparatus, comprising:
a calculation unit configured to calculate, for Access Points (APs), a basic frequency band that is not shared by the APs based on a frequency band of at least one Mobile Station (MS) configured to communicate with a respective one of the APs, a number of MSs connected to the respective one of the APs, and an available bandwidth of the respective one of the APs and an outage ratio;
a control unit configured to divide a frequency band, the frequency band being available to the plurality of APs, into the calculated basic frequency band of each of the plurality of APs and a common frequency band shared by the plurality of APs; and
a communication unit configured to communicate, to each of the plurality of APs, the AP's basic frequency band and information of the common frequency band, and
wherein the outage ratio indicates a ratio that an MS is or not provided with service.

2. The frequency band setting apparatus of claim 1, wherein the control unit is further configured to divide the available frequency band to enable the common frequency band to be contiguous with the basic frequency band of the APs.

3. The frequency band setting apparatus of claim 1, wherein the control unit is further configured to divide the available frequency band to enable the common frequency band to be non-contiguous with the basic frequency band of at least one of the APs.

4. An Access Point (AP), comprising:
a communication unit configured to receive a request for assignment of a required frequency band from a Mobile Station (MS); and
a control unit configured to:
calculate a basic frequency band of the AP that is not shared by APs based on a frequency band for MSs configured to communicate with the AP, a number of MSs connected to the AP, and an available bandwidth of the AP, and an outage ratio;
compare a bandwidth of the required frequency band requested by the MS with a bandwidth of the basic frequency band, and
in response to the bandwidth of the required frequency band being greater than the bandwidth of the basic frequency band, assign a common frequency band, shared by the APs, to the MS, and
wherein the outage ratio indicates a ratio that an MS is or not provided with service.

5. The AP of claim 4, wherein the control unit is further configured to assign an entirety of the common frequency band or a portion of the common frequency band to the MS, depending on the bandwidth of the required frequency band.

6. The AP of claim 4, wherein the common frequency band is set by the control unit or a network controller.

7. The AP of claim 6, wherein:
in response to the common frequency band being set by the network controller, the communication unit is further configured to:
request the network controller for use of the set common frequency band, and
receive a token from the network controller, the token allowing the set common frequency band to be used; and the control unit is further configured to assign the set common frequency band to the MS in response to the receipt of the token.

8. The AP of claim 7, wherein, in response to the use of the common frequency band being completed, the communication unit is further configured to return the token to the network controller.

9. The AP of claim 6, wherein the control unit or the network controller is further configured to divide a frequency band, which is available to the APs, into the common frequency band and basic frequency bands of the respective APs that are not shared by the APs.

10. The AP of claim 4, wherein:
the communication unit is further configured to request a network controller to assign the calculated basic frequency band to the AP; and
the control unit is further configured to receive the assigned basic frequency band and the common frequency band from the network controller.

11. The AP of claim 4, further comprising, in response to the bandwidth of the required frequency band being greater than the bandwidth of the basic frequency band, broadcasting, to the MS, a frame to report to the MS that the common frequency band is assigned to the MS.

12. The AP of claim 4, further comprising, in response to the bandwidth of the required frequency band being less than or equal to the bandwidth of the basic frequency band:
releasing the common frequency band from the MS; and
broadcasting, to the MS, a frame to report to the MS that the common frequency band is released from the MS.

13. A frequency band setting method, comprising:
calculating a basic frequency band of each of Access Points (APs) that is not shared by the APs, based on a frequency band of at least one Mobile Station (MS) configured to communicate with a respective one of the APs, a number of MSs connected to the respective one of the APs, and an available bandwidth of the respective one of the APs, and an outage ratio;
dividing a frequency band, which is available to the APs, into the calculated basic frequency band of each of the APs and a common frequency band shared by the APs; and
a communicating, to each of the APs, the AP's basic frequency band and information of the common frequency band, and
wherein the outage ratio indicates a ratio that an MS is or not provided with service.

14. The frequency band setting method of claim 13, wherein the dividing of the frequency band comprises dividing the available frequency band to enable the common frequency band to be contiguous with the basic frequency band of each of the APs.

15. The frequency band setting method of claim 13, wherein the dividing of the frequency band comprises dividing the available frequency band to enable the common frequency band to be non-contiguous with at least one of the basic frequency band of at least one of the APs.

16. A method of using a common frequency band of an Access Point (AP), the method comprising:
receiving a request for assignment of a required frequency band from a Mobile Station (MS);
calculating a basic frequency band for the AP that is not shared by APs based on a frequency band for MSs, a number of MSs connected to the AP, and an available bandwidth of the AP, and an outage ratio;
comparing a bandwidth of the required frequency band requested by the MS with a bandwidth of the basic frequency band; and
assigning the common frequency band, shared by the APs, to the MS in response to the bandwidth of the required frequency band being greater than the bandwidth of the basic frequency band, and
wherein the outage ratio indicates a ratio that an MS is or not provided with service.

17. The method of claim 16, wherein the assigning of the common frequency band comprises assigning the common frequency band to the MS, depending on the bandwidth of the required frequency band.

18. The method of claim 16, wherein the common frequency band is set by the AP or a network controller.

19. The method of claim 18, wherein, in response to the common frequency band being set by the network controller, the assigning of the common frequency band comprises:
requesting the network controller for use of the set common frequency band;
receiving a token from the network controller, the token allowing the set common frequency band to be used; and
assigning the common frequency band to the MS in response to the receipt of the token.

20. The method of claim 19, further comprising, in response to the use of the common frequency band being completed, returning the token to the network controller.

21. The method of claim 18, wherein the network controller or the AP divides a frequency band, which is available to the APs, into the common frequency band and basic frequency bands of the respective APs that are not shared by the APs.

22. The method of claim 16, further comprising:
calculating the basic frequency band of the AP based on a frequency band for MSs;
requesting a network controller to assign the calculated basic frequency band to the AP; and
receiving the assigned basic frequency band and the common frequency band from the network controller.

23. A non-transitory computer-readable recording medium storing a program for implementing a frequency band setting method, the method comprising:
calculating a basic frequency band of Access Points (APs) that is not shared by the plurality of APs, based on a frequency band of at least one Mobile Station (MS) configured to communicate with a respective one of the APs, a number of MSs connected to the respective one of the APs, and an available bandwidth of the respective one of the APs, and an outage ratio;
dividing a frequency band, which is available to the APs, into the calculated basic frequency band of each of the APs and a common frequency band shared by the APs; and
a communicating, to each of the APs, the AP's basic frequency band and information of the common frequency band, and
wherein the outage ratio indicates a ratio that an MS is or not provided with service.

* * * * *